Aug. 30, 1955  K. WIECK  2,716,392
DEVICE FOR THE DRIVE OF OSCILLATING SYSTEMS
IN PARTICULAR FOR MACHINING
Filed April 19, 1951  3 Sheets-Sheet 2
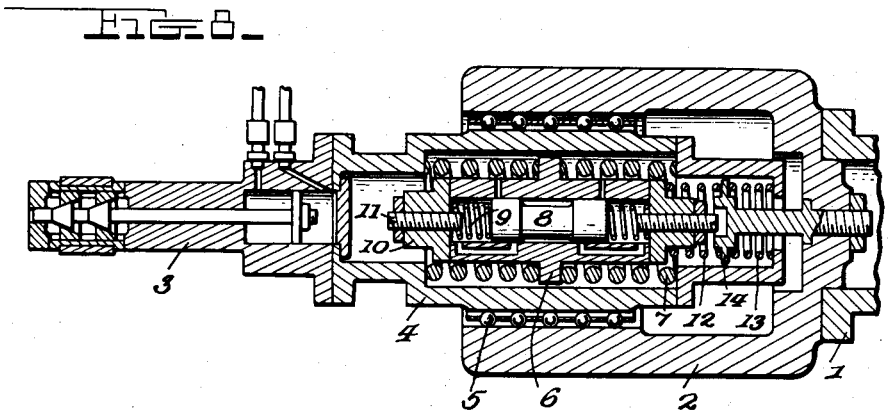
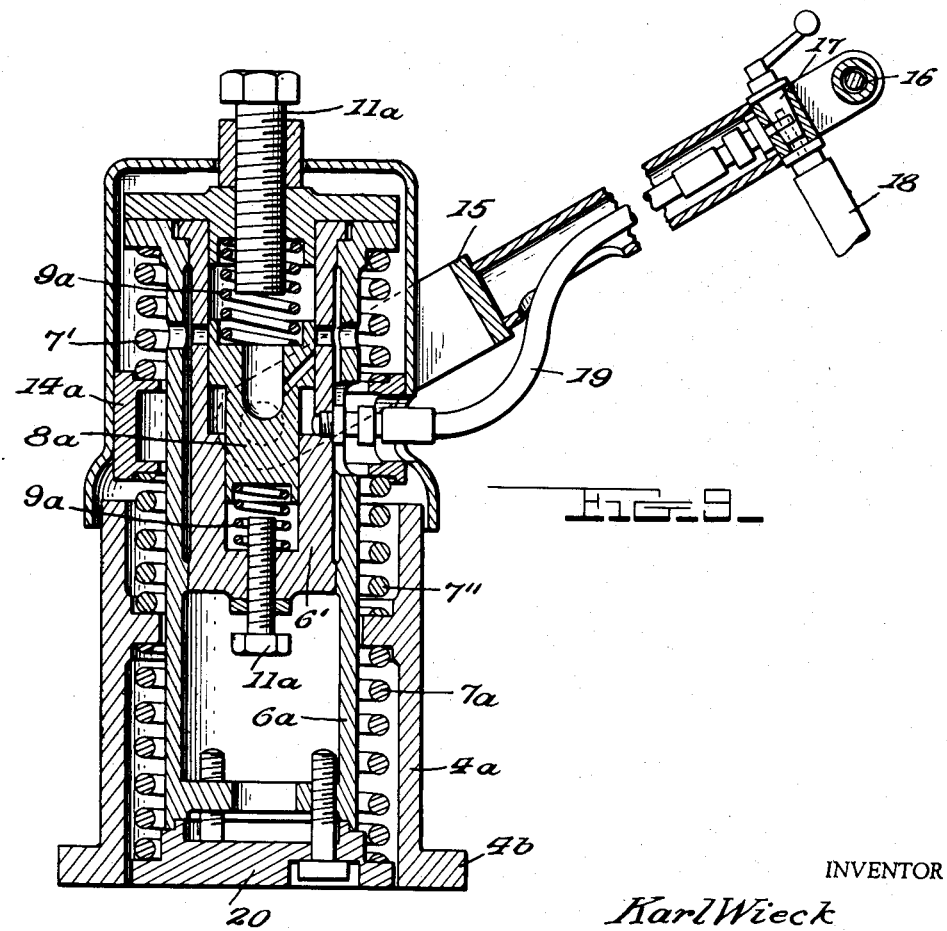
INVENTOR
Karl Wieck
BY Bryant & Lowry
ATTORNEYS Aug. 30, 1955
K. WIECK
2,716,392
DEVICE FOR THE DRIVE OF OSCILLATING SYSTEMS
IN PARTICULAR FOR MACHINING
Filed April 19, 1951
3 Sheets-Sheet 3
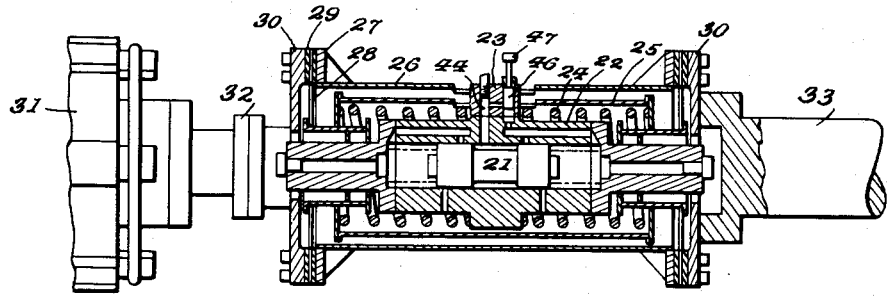
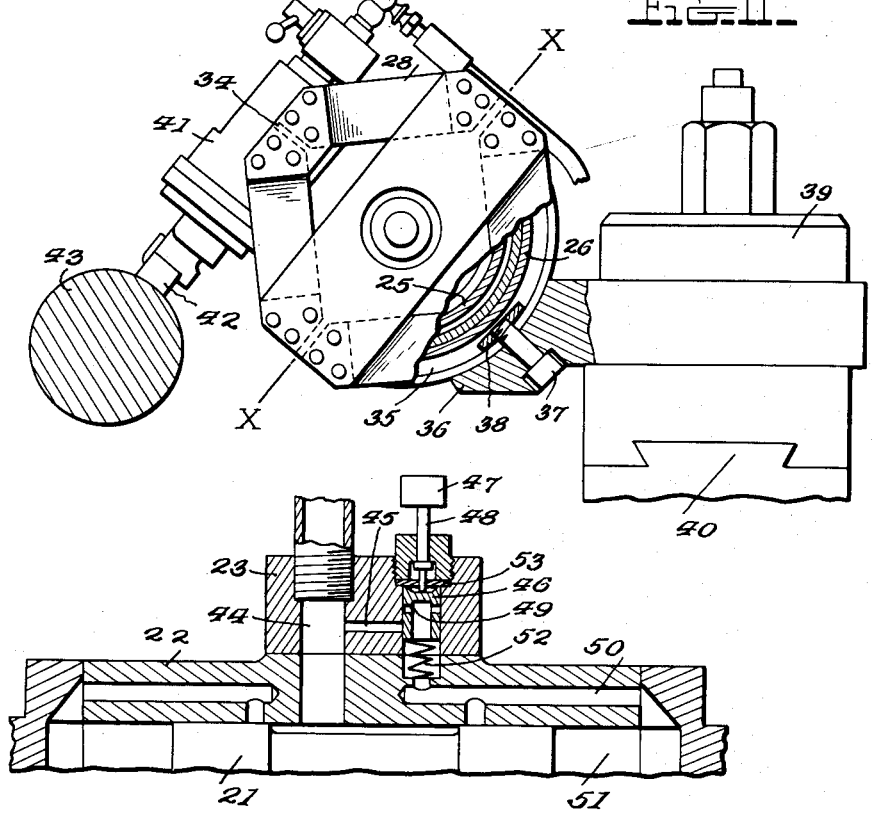
INVENTOR
*Karl Wieck*
BY *Bryant & Lowry*
ATTORNEYS

United States Patent Office

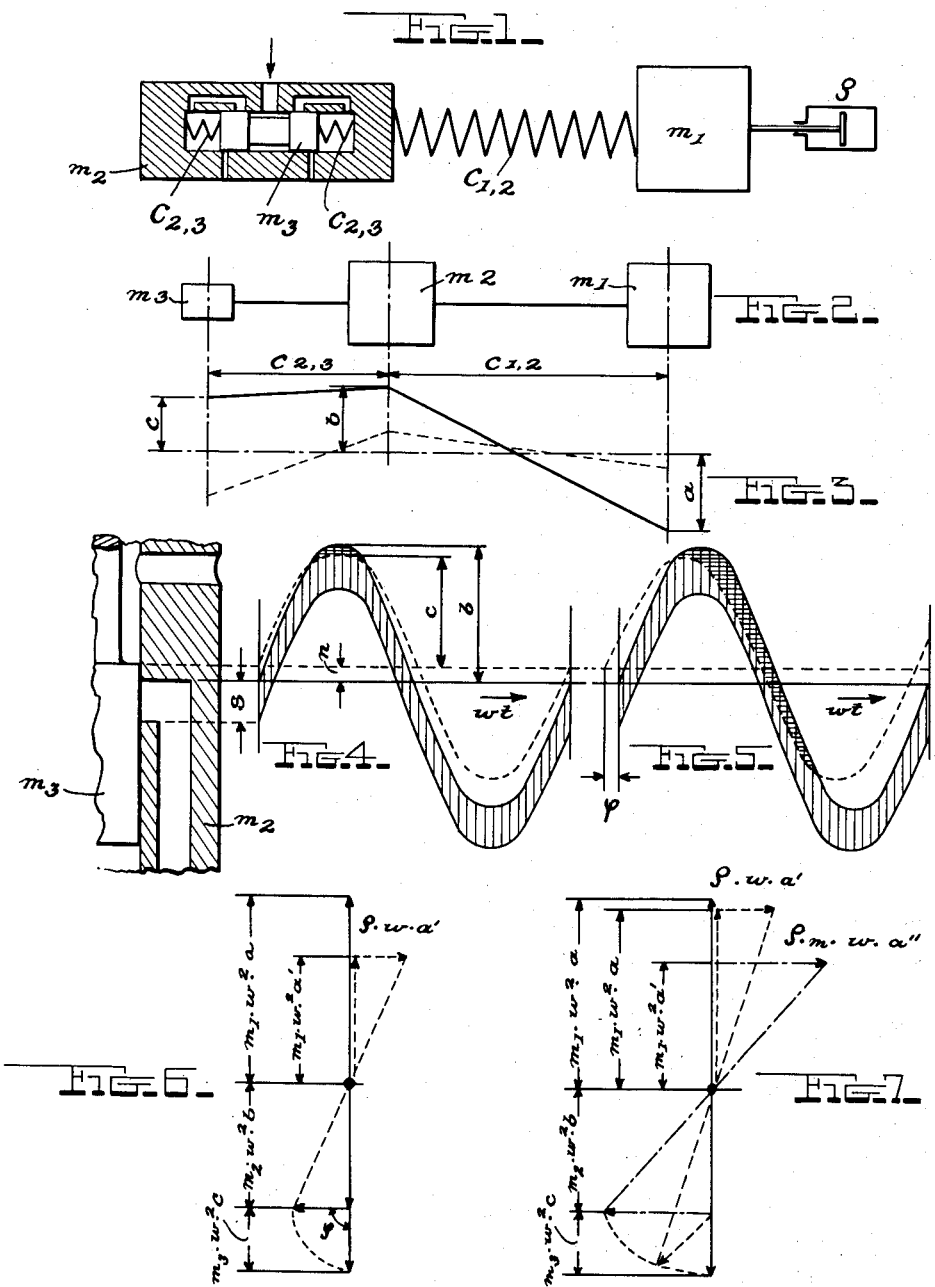

2,716,392
Patented Aug. 30, 1955

2,716,392

DEVICE FOR THE DRIVE OF OSCILLATING SYSTEMS IN PARTICULAR FOR MACHINING

Karl Wieck, Stuttgart, Germany

Application April 19, 1951, Serial No. 221,766

7 Claims. (Cl. 121—17)

The present invention refers to a method for the drive of oscillating systems with two or several masses which are combined in a known manner by elastic components, thereby performing work in form of liquid damping, friction, impact, or the like. It is known to excite such systems in the neighbourhood of resonance, be it by rotating eccentric masses, by magnetic fields excited by alternating current or other devices. All these exciting devices have in common that they require too much expense which undergoes the advantages of the oscillating system which is simple in itself.

The mechanical excitation by means of eccentrical masses requires, if smooth running is necessary, two eccentric masses oppositely coupled by means of tooth wheels, elastic means of transmission and a sensitive and continuously controllable drive, be it by means of a shunt direct current motor or by asynchronous motors with additional continuously controllable gearing. It is a well known fact that the eccentrical masses must be designed so heavy that they can perform a manyfold of the exciting power for the resonance in order to be able to run within a range of the curve of resonance where the drop of the amplitudes with increasing damping force is not noticed too strongly. In case of asynchronous motor drives heavy over dimensioning is required in order to avoid noticeable drop of revolutions per minute which means drop of amplitudes in case of increasing load.

Electromagnetic exciters are bound to a certain alternating current frequency, or complicated frequency converters have to be employed.

It is very difficult to control these devices so that they cannot be employed in cases of changing operating conditions.

In contrast to these aforementioned methods the present invention suggests to effect the excitation by means of a piston controlled by compressed air which piston, however, has several outstanding features as compared with the usually known compressed air drives.

The method according to the invention is mainly distinguished by the employment of one mass of excitation and one or several main masses and by the fact that the mass of excitation is represented by a piston which is movable within a guiding cylinder and which is controlled advantageously by compressed air. Hereby the guiding cylinder is a component of one of the main masses of the oscillating system and the piston is coupled with the guiding cylinder by means of elastic matter in such a way that the piston undergoes a phase displacement against the guiding cylinder when transmitting a damping resistance on the oscillating system, which phase displacement results in an increased opening of the air channels leading to the working chambers of the cylinder.

According to a further feature of the invention the exciter piston is elastically supported in such a way that the oscillation of the piston in case of undamped oscillation is in phase with the oscillation of the cylinder. The elastic means between the guiding cylinder and the piston can be represented by the air cushion within the working chambers of the cylinder and on the other hand by additional springs mounted between the piston and the guiding cylinder. According to the invention the oscillating movement, e. g. of a tool holder is effected in such a way that said tool holder is a component of a multiple mass oscillating system whereby said system is excited by an exciter piston. Hereby a complete equalisation of masses is attained, i. e. the working frequencies can be carried very high without the danger of the occurrence of percussions of the machine tool. If all oscillating members are suitably chosen the adjusted amplitude can be kept constant very exactly at all stages of load, whereby the consumption of compressed air is controlled automatically according to the tool thrust. Since the employment of the method according to the invention eliminates expensive motors, gearings, etc., difficult to be placed, an extraordinary simple construction can be attained requiring very little room which has considerable additional advantages owing to the employed method. The amplitude can be controlled very exactly by means of a throttle valve which is placed in the feeding line for the compressed air. The system is very indifferent towards variations of pressure in the pressure line, the air consumption is very low and is automatically controlled by the required power.

The equipment according to the invention can be employed for many different purposes, i. e. for the machining of parts and materials. The equipment can be employed, e. g. for the processing of highly finished surfaces of cylindrical or level parts as well as for borings, whereby the tool, e. g. the grinding head or lapping stick perform an oscillating movement whilst the work is rotating. Simultaneously the tool can be given any desired feeding movement.

Equipments for this purpose are known but generally they are bulky and heavy and they can only be mounted on existing machine tools if considerable alterations are made on these machine tools. The mass powers owing to the reciprocating tool masses call imperatively for low oscillating frequencies in order to avoid strong percussions. For the same reason the tool holders must be light, i. e. the number of grinding heads to be employed is limited by mechanical reasons. The wear on the guide tracks and transmitting means is very high, so that frequent repairs are unavoidable.

The drawing represents several examples of the principle of the method and of the device according to the invention.

Fig. 1 represents the scheme of the oscillating system according to the invention;

Fig. 2 shows the same oscillating system without dampings;

In Fig. 3 the diagrams for the oscillating systems are represented;

Figs. 4 and 5 illustrate diagrammatically the ratio of movement of two masses;

Figs. 6 and 7 illustrate a three mass system in a vector diagram;

Fig. 8 shows an example of a device for the machining of surfaces;

Fig. 9 shows the employment of the device according to the invention for a stamping equipment;

Fig. 10 represents a longitudinal section of a different example of a device according to Fig. 8, showing a section along the line X—X of Fig. 11, whereby the equipment holds a tool for the machining of borings;

Fig. 11 represents a side view of the equipment, partly in section, for the illustration of the swivelling device, the equipment holding a tool for external machining;

Fig. 12 shows an enlarged representation of the starting device for the exciter piston.

In Fig. 1 an oscillating system is represented with an exciter according to the invention. $m_1$ and $m_2$ stand for two main masses which are coupled by means of an elastic matter $C_{1,2}$. The main mass $m_2$ represents simultaneously the guiding cylinder for a third mass, i. e. a piston mass $m_3$ and therefore is provided with controlling channels which serve in a known manner to control the air in order to put the piston into reciprocating motion. To start this movement it is necessary to bring the piston into an extreme position which is effected by a starting device which is not represented here, e. g. by a device for the motioning of the piston which can be controlled from the outside or by auxiliary channels or other known devices.

The mass of the piston $m_3$ is coupled with the main mass by means of elastic means $C_{2,3}$ which is represented by the compressed air within the working chambers of the guiding cylinder and by elastic means, e. g. by helical springs. It is furthermore suggested to render the working chambers adjustable in size, e. g. by means of a screw which can be screwed in more or less, thus altering the elastic constant of the air and changing at the same time the resulting modulus of elasticity $C_{2,3}$. Apart from that, a damping $\rho$ is represented schematically in Fig. 1 which acts upon the mass $m_1$.

In Fig. 2 the same oscillating system is represented as demonstrated in Fig. 1 except for the damping $\rho$ and in a simplified manner, whereby the distances between the masses $m_1$ and $m_2$, or $m_2$ and $m_3$ respectively are a measure for the elasticities $C_{1,2}$ or $C_{2,3}$ respectively.

In Fig. 3, below Fig. 2, the possible forms of oscillation are shown. The drawn out line represents the form of oscillation comprising a nodal point of vibration within the elasticity $C_{1,2}$, whereby the distances $a$, $b$, and $c$ are a measure for the magnitude of the amplitudes of the masses $m_1$, $m_2$ and $m_3$. The dotted line shows the form of oscillation comprising two nodal points of vibration, representing a stage where there is one nodal point of vibration within the elasticity $C_{1,2}$ and another one within the elastic matter $C_{2,3}$.

In the following description only the form of oscillation comprising one nodal point of vibration shall be discussed, since here the advantages according to the invention are obviously to be found.

In Fig. 4 the movement of the masses $m_2$ and $m_3$ is represented under the condition that no damping forces act upon the system. The vertically hatched area shows the movement of the controlling slot of the width $s$ with which the mass $m_2$ is provided and the dotted line shows the movement of the controlling edge of the piston $m_3$ which differs in position compared to the edge of the slot by the distance $n$ in its initial position. The amplitude of the mass $m_2$ and therewith of the controlling slot $s$ be assumed equal to $b$, according to Fig. 3, the amplitude of the mass of the piston $m_3$ and therewith of the controlling edge is equal to $c$. The cross hatched area represents the time section for the passage of the air into the working chamber of the guiding cylinder. In Fig. 5 the ratio of the movements are represented with equal amplitudes but the movement of the mass of the piston $m_3$ is shifted by the phase angle $\varphi$ against the movement of the guiding cylinder. The cross hatched time section is here considerably larger than is the case in Fig. 4. Accordingly, a higher weight of air will expand within the working chambers of the cylinder, thus effecting larger amplitudes of the piston.

The exciting principle according to the invention has the property to operate with a very small phase angle $\varphi$ of the exciting mass in case of dampings up to a certain magnitude, since here, in opposition to eccentric exciters, an essential part of the damping is covered by the increase of the mass force of the exciter. Only when the damping continues to increase a stage can be reached where a further increase of the time section does not effect any increase of the amplitude of the piston, e. g. when the controlling slots are completely uncovered. From this stage of "saturation" onwards the increasing damping will be covered by larger phase angles $\varphi$.

In order to illustrate the difference between an eccentric mass exciter and the principle according to the invention a vector diagram is shown in Fig. 6 representing a three mass system with an exciter of constant force of mass, e. g. an eccentric mass. The vectors represent the mass forces $m_1.\omega^2.a$, $m_2.\omega^2.b$, and $m_3.\omega^2.c$ of the masses $m_1$, $m_2$, and $m_3$ at the angular velocity $\omega$ of the oscillation and the amplitudes $a$, $b$, and $c$. In case of eccentric mass exciters $c$ represents the distance of the centre of gravity from its axis of rotation. The highest possible damping force $\rho.\omega.a'$ acting upon the mass $m_1$ which the system can overcome is reached if the mass of excitation $m_3$ has a phase angle $\phi=90°$ in relation to the mass $m_2$ as is demonstrated by the dotted line.

In order to ensure the balance of forces the mass force of the mass $m_1$ is reduced to the amount $m_1.\omega^2.a'$, and since $m_1$ and $\omega$ remain constant, this can only be attained by diminishing the amplitude, i. e. the difference $m_1.\omega^2.a - m_1.\omega^2.a'$ is a measure for the drop of the amplitude of the mass $m_1$ under the action of the damping $\rho.\omega.a'$.

In contrast herewith Fig. 7 shows a vector diagram of the system according to the invention, the markings and the magnitudes of the vectors in case of an undamped system being the same as in Fig. 6. Since, as described above, the force of mass of the exciter $m_3.\omega^2.c$ is no constant value owing to the increasing amplitude $c$ in case of an acting damping, the end of the vector $m_3.\omega^2.c$ does not perform a circle, as shown in Fig. 6, but a curve, the shape of which depends upon the measures and the position of the controlling slots, the air sections, the frequency and other factors, and which can be approximately regarded as a part of an ellipsis. If the same damping $\rho.\omega.a'$ as mentioned in Fig. 6 is acting upon the mass $m_1$ the phase angle $\phi$ is still far off from 90°. The drop of amplitude of the mass $m_1 = m_1.\omega^2.a - m_1.\omega^2.a'$ is almost negligible. The maximum damping power $\rho_m.\omega.a''$ which the system can overcome is far greater than compared with Fig. 6. The exciting mass according to the invention could be made much smaller under equal damping conditions as compared with an eccentric mass oscillating system.

In case of a given maximum damping, the size of the working chambers should be chosen in such a way, or the described adapting device should be set in such a manner that the phase angle $\phi$ is approx. 90° if this maximum damping is reached in order to be able to operate the system with a minimum air consumption. If the damping is increased beyond this value resulting in a phase angle $\phi$ greater than 90°, a heavy drop of the amplitude is to be noticed in case of eccentric mass exciters until eventual complete stoppage occurs. But in case of the system according to the invention a nodal point of vibration is effected between $m_2$ and $m_3$ if the phase angle $\phi$ becomes greater than 90°, compelling the system to operate on a higher level of oscillation with an increased frequency.

In order to avoid this, the working chambers of the cylinder should be enlarged. But it is also possible to use this form of oscillation in order to obtain high frequencies at low amplitudes, or to transfer the system from one form of oscillation to the other by a sudden change of the volume of the working chambers, in case the operating process calls for such a change.

The application of the method according to the invention will be explained in several examples:

Fig. 8 represents an oscillating honing tool which operates with high frequency. The tool holder 1 is rigidly connected with the guiding frame 2 of a machine tool. In the frame 2 the mass 4 which carries the honing tool 3 is movably supported by means of balls 5. The mass 6 which carries the guiding cylinder with the control channels for the piston 8 is supported by means of the main springs 7 within the mass 4. Between the piston 8 and the cylinder 6 the springs 9 are provided. The caps 10 of the cylinder 6 are provided with adjusting screws 11 for the adjustment of the volume of the working chambers. The entire oscillating system is supported within the frame 2 by means of the support 14 at the nodal point of the elasticities 12 and 13.

Fig. 9 represents an example of the employment for a stamping equipment which has two working masses. The mass 6a carries the guiding cylinder 6' for the step piston 8a which is supported against the cylinder by means of the springs 9a. As in Fig. 8 adjusting screws 11a are provided for the adjustment of the volume of the working chambers. The mass 6a is supported against the mass 4a by means of the springs 7a. The top spring is divided in two springs 7' and 7" in such a manner that the supporting ring 14a is situated in the nodal point of the elasticity 7'—7". The fork of the holder 15 with the handle 16 is attached to the supporting ring 14a. The holder contains the throttle valve 17 which is interposed between the feeding line 18 and the connection line 19 for the compressed air. 20 and 4b are the two oscillating stamping faces of the equipment which operate contrarily.

For superfinishing of surfaces it is suggested, according to the invention, to arrange the guiding cylinder of the compressed air controlled exciting piston within a tubular tool holder which in turn is enclosed by a fixed holder which advantageously is also shaped as a part of a tube. The tool holder is guided within the holder by means of thin plate springs which are positioned at each end of the tool holder and holder respectively. In order to allow these plate springs sufficient mobility and to keep off too high tensile stresses they are clamped at the tool holder or/and the holder between elastic plates which permit a little yielding in case of maximum amplitudes. In this manner a very exact parallel guiding of the tool holder is secured without the employment of wearing parts whatsoever. Furthermore it is suggested to connect the holder which is shaped as a part of a tube at its external circumference with a helve in such a manner that the holder can be turned within the grooved helve so that it can be fixed in any desired position. The helve is shaped at its rear end in such a way that it can be clamped into every clamping device of a machine tool, e. g. a lathe. This arrangement permits to direct the tools always radially towards the work independently from the kind of the clamping device or of the diameter of the work to be machined.

Furthermore it is possible to attach a tool for the internal machining of borings at the face of the tool holder, e. g. a honing tool. This arrangement permits to machine rotating works at the inside whereby the work performs a fast oscillating movement in axial direction and, simultaneously, if it is desired, a slow feeding movement which is controlled by the machine tool. Such a construction can be used with negligible alterations for the machining of very deep borings owing to its small dimensions, whereby the equipment is inserted with the tool at its end into the boring, e. g. by means of a boring rod. In this way high rod weights can be avoided, the reciprocating movement of which can cause trouble due to their mass forces.

In order to start the equipment, i. e. for the starting of the exciter piston a device is suggested which eliminates the drawbacks of the known by-channels etc. Such devices would increase to a high extent the air consumption which is ordinarily very low and are not in a position to give the piston, which is supported between springs, the necessary impulse. A quick start is attained by a small starting piston loaded by a spring which can be shifted by a push button so far that a path is opened from the feeding boring for the compressed air to a working chamber of the guiding cylinder and therewith the exciter piston is brought out of its initial position. Thus the equipment begins to operate, the push button is released and the starting piston returns to its initial position owing to the spring pressure and to the compressed air and is butted with its sharp upper edge against a seal so that no air losses can arise.

In Fig. 10 the exciter piston 21, the guiding cylinder 22 of the exciter piston, and the starting device 23 on the guiding cylinder are represented. By means of the main springs 24 the guiding cylinder 22 is connected with the tubular tool holder 25 which is partially enclosed by the holder 26 which is shaped as a part of a tube. At the holder 26 the clamping flanges 27 are fitted where the plate springs 28 are clamped between elastic plates 29 by means of the end flange 30. The clamping of the plate springs is analogically effected at the tool holder 25 and is not visible here. Furthermore a honing tool 31 is shown which is attached to the bridge 32 which in turn is connected with the tool holder 25. At the other end of the equipment e. g. a boring rod 33 is attached to the end flange 30. In Fig. 11 the same markings are chosen as in Fig. 10. Here the fastenings 34 of the plate springs 28 at the tool holder 25 are visible. Furthermore the swivelling device is made clearly visible by a partial section. The clamping segment 35 attached to the holder 26 lies in the grooved helve 36 and can be swivelled in said helve and can be fixed by means of the clamping screw 37 and clamping nut 38 in every desired position. The helve 36 is fixed here by way of example within the tool holder of a lathe rest 40. Furthermore a block slide 41 is represented by means of which the grinding head 42 is pressed against the work 43.

Fig. 12 represents the starting device 23, mentioned in Fig. 10, more clearly which is mounted on the guiding cylinder 22 of the exciter piston 21. The feeding channel 44 for the compressed air has a branch 45 which leads to the starting piston 46. If the starting piston is pressed down by means of the push button 47 and the pushing rod 48, compressed air enters via the branch 45, the borings 49, the channel 50 into the cylinder chamber 51. The spring 52 resets the starting piston to its initial position and against the seal 53.

I claim:

1. A tool supporting mechanism having oscillation compensation for a machine tool, having a frame, a working tool guide rigidly fixed to said frame, a tool carrier reciprocably mounted in said frame, said tool carrier being of hollow cylindrical formation, a reciprocable element within said tool carrier having hollow cylindrical formation and a normal position longitudinally of the tool carrier, opposed spring means engaging the reciprocable element and the carrier and resisting displacement of the latter from its normal position, a piston in said reciprocable element, means to effect reciprocation of the piston in the reciprocable element, and elastic cushioning means at each end of the piston movement.

2. A tool supporting mechanism having oscillation compensation for a machine tool, having a frame, a working tool guide rigidly fixed to said frame, a tool carrier reciprocably mounted in said frame, said tool carrier being of hollow cylindrical formation, a reciprocable element within said tool carrier having hollow cylindrical formation and a normal position longitudinally of the tool carrier, opposed spring means engaging the reciprocable element and the carrier and resisting displacement of the latter from its normal position, said tool carrier and reciprocable element having circumferential ribs one of which is integral with one of the last mentioned elements and the other ribs are carried by the other of said elements on opposite sides of the first mentioned rib, said spring means being seated between said ribs, a piston in said reciprocable element, means to effect reciprocation of the piston in the reciprocable element, and elastic cushioning means at each end of the piston movement.

3. A tool supporting mechanism having oscillation compensation for a machine tool, having a frame, a working tool guide rigidly fixed to said frame, a tool carrier reciprocably mounted in said frame, said tool carrier being of hollow cylindrical formation, a reciprocable element within said tool carrier having hollow cylindrical formation and a normal position longitudinally of the tool carrier, opposed spring means engaging the reciprocable element and the carrier and resisting displacement of the latter from its normal position, a piston in said reciprocable element, said reciprocable element having supply and exhaust ports opening into its interior and controlled by said piston, air supply means connected to said supply ports, and elastic cushioning means at each end of the piston movement.

4. In a tool support having oscillation compensation, a guide cylinder having fixed support, a hollow cylinder axially alined in said guide cylinder and reciprocable therein, anti-friction bearings between said cylinders, said reciprocable hollow cylinder having a pair of confronting shoulders extending circumferentially around its interior, a third hollow cylinder oscillatable in the reciprocating cylinder and provided with a circumferential rib intermediate its ends and between said shoulders, a pair of relatively heavy opposed springs disposed between the reciprocating and third cylinders, and seated against said shoulders and rib, a pair of relatively light springs disposed between the inner ends of the reciprocating and third cylinders, tool securing means affixed to the outer end of the reciprocating cylinder, a piston reciprocable in the third cylinder, and elastic means resisting reciprocation of said piston.

5. The device of claim 4, wherein pneumatic means is provided for effecting oscillation of said piston.

6. In a tool support having oscillation compensation, an outer cylinder forming a guide and having an internal circumferential rib, a second cylinder oscillatable within the outer cylinder and having a shoulder at one end opposed to said rib, a relatively strong spring surrounding the second cylinder and seated against said shoulder and rib, a fixed annular member surrounding the second cylinder and having an air passage therein, a second relatively strong spring surrounding said second cylinder and seated against said rib and annular member, a flange on the second cylinder in spaced relation to said annular member, a third relatively strong spring surrounding the second cylinder and seated against said flange and the annular member, a third cylinder fixedly mounted in the second cylinder, said second and third cylinders having air inlet ports opening from the annular member and having exhaust ports open to the atmosphere, means to supply said annular member with air, a reciprocable piston in the third cylinder constituting a valve controlling said ports, and elastic means between the ends of said piston and the ends of the third cylinder.

7. The device of claim 6 wherein means is provided for modifying the modulus of elasticity of said elastic means.

References Cited in the file of this patent

UNITED STATES PATENTS

| | | |
|---|---|---|
| 2,452,211 | Rosenthal | Oct. 26, 1948 |
| 2,618,107 | Martin | Nov. 18, 1952 |

FOREIGN PATENTS

| | | |
|---|---|---|
| 121,952 | Sweden | June 15, 1948 |